(12) United States Patent
Griffin et al.

(10) Patent No.: US 11,170,354 B2
(45) Date of Patent: Nov. 9, 2021

(54) WIRELESS SYSTEMS AND METHODS FOR BILL PAYMENT

(71) Applicant: Perk Hero Software Inc., Vancouver (CA)

(72) Inventors: Desmond Griffin, Vancouver (CA); Angela Griffin, Vancouver (CA)

(73) Assignee: Perk Hero Software Inc., Vancouver (CA)

( * ) Notice: Subject to any disclaimer, the term of this patent is extended or adjusted under 35 U.S.C. 154(b) by 119 days.

(21) Appl. No.: 16/493,139

(22) PCT Filed: Mar. 12, 2018

(86) PCT No.: PCT/CA2018/050292
§ 371 (c)(1),
(2) Date: Sep. 11, 2019

(87) PCT Pub. No.: WO2018/165746
PCT Pub. Date: Sep. 20, 2018

(65) Prior Publication Data
US 2020/0118101 A1    Apr. 16, 2020

Related U.S. Application Data

(60) Provisional application No. 62/472,288, filed on Mar. 16, 2017.

(51) Int. Cl.
*G06Q 20/10*    (2012.01)
*H04W 4/80*    (2018.01)
(Continued)

(52) U.S. Cl.
CPC ....... *G06Q 20/102* (2013.01); *G06K 7/10297* (2013.01); *G06Q 20/20* (2013.01);
(Continued)

(58) Field of Classification Search
CPC .. G06Q 20/102; G06Q 20/20; G06Q 20/3224; G06Q 20/3276; H04W 4/80;
(Continued)

(56) References Cited

U.S. PATENT DOCUMENTS

| 9,240,006 B2 | 1/2016 | White et al. |
| 2002/0069165 A1 | 6/2002 | O'neil |

(Continued)

FOREIGN PATENT DOCUMENTS

| EP | 2991389 A1 | 3/2016 |
| WO | 2013090367 A1 | 6/2013 |
| WO | 20150166255 | 11/2015 |

OTHER PUBLICATIONS

Extended European Search Report; EP 18768559.9 dated Dec. 9, 2020.

(Continued)

*Primary Examiner* — Garcia Ade
(74) *Attorney, Agent, or Firm* — Ridout and Maybee LLP

(57) ABSTRACT

Systems and methods for enabling payment of invoices are provided. A method of creating an electronic payment transaction includes receiving location information of a user device; obtaining billing information of a user associated with the user device from a retailer according to the location information; sending a request to the user to confirm a payment amount; and in response to receiving confirmation from the user of a confirmed payment amount, creating an electronic payment transaction to deduct the confirmed payment amount from an account associated with the user and to provide a payment to an account associated with the retailer for the confirmed amount.

19 Claims, 8 Drawing Sheets

(51) Int. Cl.
  *G06K 7/10* (2006.01)
  *G06Q 20/20* (2012.01)
  *G06Q 20/32* (2012.01)
  *H04W 4/021* (2018.01)
  *H04W 4/24* (2018.01)
  *H04W 24/08* (2009.01)
  *G06Q 20/18* (2012.01)

(52) U.S. Cl.
  CPC ........ *G06Q 20/3224* (2013.01); *H04W 4/021* (2013.01); *H04W 4/24* (2013.01); *H04W 4/80* (2018.02); *H04W 24/08* (2013.01)

(58) Field of Classification Search
  CPC ....... H04W 4/021; H04W 4/24; H04W 24/08; G06K 7/10297
  USPC .......................................................... 705/16
  See application file for complete search history.

(56) References Cited

U.S. PATENT DOCUMENTS

| | | |
|---|---|---|
| 2004/0129770 A1 | 7/2004 | Masuno |
| 2006/0020487 A1 | 1/2006 | Spittel et al. |
| 2006/0080240 A1* | 4/2006 | Mersky ................. G06Q 20/18 705/40 |
| 2008/0270217 A1 | 10/2008 | Spittel et al. |
| 2009/0210343 A1 | 8/2009 | Griffin |
| 2013/0138518 A1* | 5/2013 | White .................. G06Q 20/325 705/16 |
| 2013/0246203 A1* | 9/2013 | Laracey ............... G06Q 20/401 705/21 |
| 2014/0330654 A1 | 11/2014 | Turney et al. |
| 2015/0046276 A1 | 2/2015 | Artman et al. |
| 2015/0106213 A1 | 4/2015 | Guen |
| 2015/0356545 A1 | 12/2015 | Marcuccilli |
| 2017/0124540 A1 | 5/2017 | Chan |
| 2018/0268408 A1* | 9/2018 | Botros ................. G06Q 20/405 |
| 2020/0104837 A9* | 4/2020 | Govindarajan ........ G06Q 20/34 |

OTHER PUBLICATIONS

Office Action; Canadian Application No. 3056001 dated Jan. 26, 2021.
Office Action; U.S. Appl. No. 15/471,303, dated May 16, 2019.
Final Rejection; U.S. Appl. No. 15/471,303, dated Oct. 21, 2019.
Advisory Action; U.S. Appl. No. 15/471,303, dated Jan. 24, 2020.
International Search Report and Written Opinion; PCT/CA2018/050292 dated May 14, 2018.
http://web.archive.org/web/20170127124940/http://www.glancepay.com Apr. 23, 2018.
Notification concerning Transmittal of IPRP; PCT/CA2018/050292 Sep. 26, 2019.

* cited by examiner (c)            (d)

WIRELESS SYSTEMS AND METHODS FOR BILL PAYMENT

RELATED APPLICATION

This application is related to U.S. provisional patent application No. 62/472,288, filed Mar. 16, 2017, entitled WIRELESS SYSTEMS AND METHODS FOR BILL PAYMENT USING SHORT DISTANCE POSITIONING SYSTEMS, which is incorporated herein by reference.

TECHNICAL FIELD

Example embodiments relate to the fields of electronic payment transactions and systems and methods for enabling payment of invoices.

BACKGROUND

Traditional bill payment systems in retail establishments, such as restaurants, typically require a customer to pay by cash or by using a payment machine for a credit card or debit card. The payment machine may require a customer to either go to the payment machine or rely on a staff member to bring a wireless payment machine to the customer. The payment machines may be limited in number and may not be secure for the transmission of credit or debit card and personal information.

SUMMARY

According to an aspect, there is provided a method of creating an electronic payment transaction, which includes receiving location information of a user device; obtaining billing information of a user associated with the user device from a retailer according to the location information; sending a request to the user to confirm a payment amount; and in response to receiving confirmation from the user of a confirmed payment amount, creating an electronic payment transaction to deduct the confirmed payment amount from an account associated with the user and to provide a payment to an account associated with the retailer for the confirmed amount.

According to another aspect, there is provided a non-transitory computer readable storage medium having stored thereon computer-readable and computer-executable instructions, which, when executed by a processor, cause the processor to perform actions of: receiving location information of a user device; obtaining billing information of a user associated with the user device from a retailer according to the location information; sending a request to the user to confirm a payment amount; and in response to receiving confirmation from the user of a confirmed payment amount, creating an electronic payment transaction to deduct the confirmed payment amount from an account associated with the user and to provide a payment to an account associated with the retailer for the confirmed amount.

BRIEF DESCRIPTION OF THE DRAWINGS

Reference will now be made, by way of example, to the accompanying figures which show example embodiments of the present application, and in which.

Figure 1:
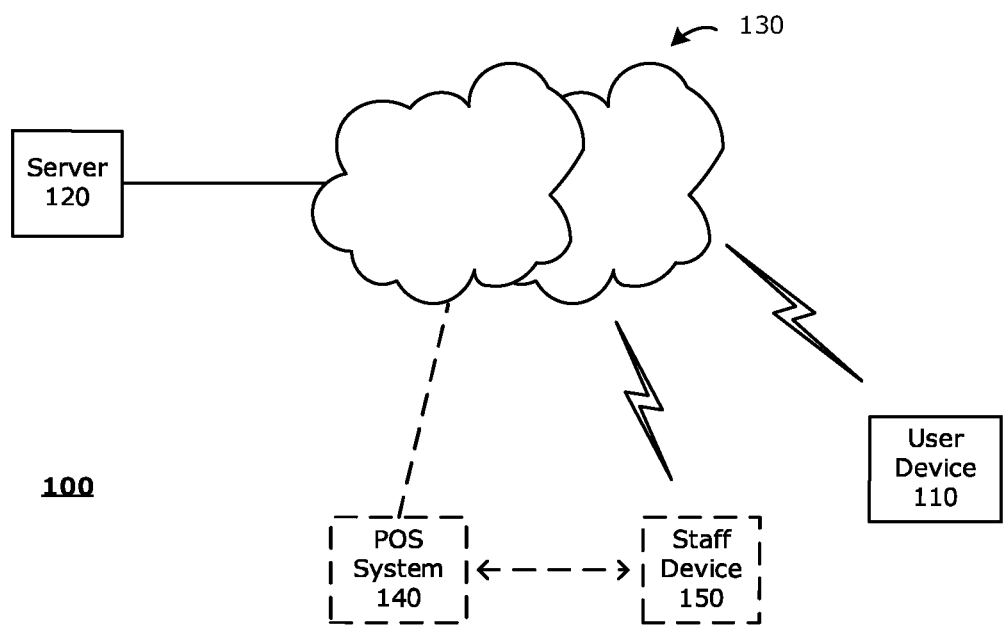
FIG. 1 is a block diagram illustrating a system in accordance with one embodiment of the present disclosure.

Like reference numerals are used throughout the Figures to denote similar elements and features While the invention will be described in conjunction with the illustrated embodiments, it will be understood that it is not intended to limit the invention to such embodiments. On the contrary, it is intended to cover all alternatives, modifications and equivalents that may be included within the spirit and scope of the invention described herein.

DETAILED DESCRIPTION OF EXAMPLE EMBODIMENTS

The present application describes methods, devices and systems which enable a user to create an electronic transaction for payment of a bill or invoice associated with a retailer or retail establishment.

In some embodiments, the customer or user captures an image of the bill with a wireless communications device and sends the image to a server operated by an electronic transaction service provider. The service provider server analyzes the captured image to determine at least the amount billed, and the retail establishment associated with the bill. The server sends a request to the user to confirm at least the payment of the billed amount. The user may confirm the retail establishment and billed amount and may take other steps, such as to add a tip to the billed amount or to pay only a portion of the billed amount. Upon receipt of confirmation from the user, the server processes payment to deduct the confirmed amount from an account associated with the user and to provide payment to the retail establishment. The server may also send a notification to the retail establishment and/or to a staff person associated with the bill in order to confirm that payment of a particular invoice has been received.

Thus, the user may pay a bill through the use of his or her own wireless device, without having to wait for the use of a point of sale (POS) terminal provided by the retail establishment. Payment is made using an account securely maintained by the service provider and without the user providing credit card information to the retailer or a third party in an unsecured or less secure environment of the retail establishment. While other software applications exist to facilitate payment for goods or services, these may require a significant level of integration with the payment or POS system used by the retail establishment. The methods, devices and systems described herein may also be used by a retailer or retail establishment that does not have a POS system.

The methods, devices and systems of the present application are described in further detail below. FIG. 1 illustrates a system 100 according to one embodiment of the present application. The system includes one or more user devices 110 which are used by users to capture and send an image of a bill to a server 120 of an electronic transaction service provider. The user device 110 has a processor and a memory configured to store and execute instructions for the electronic transaction software applications described herein. The user device 110 is configured to support wireless communications and a user interface with a display screen, keypad or buttons, and other inputs/outputs. The user device also includes an image capture component such as a camera or scanner which is configured to capture and create an image or electronic representation of a bill. The user device 110 may be a mobile phone, cellular phone, smart phone, tablet, smart watch, or other wireless communications device.

The communications between the user device 110 and server 120 are achieved through a communications network 130. The network 130 includes one or more wired or wireless networks such as a cellular telecommunications network, a wireless local area network (WLAN), such as a network operating according to the IEEE 802.11 standard or WiFi™, or combinations thereof, including the Internet and related backbone networks (not shown).

The system 100 may include a POS system 140 or other computing device of the retail establishment which is used, for example, to track orders received from customers, to issue bills, to accept payments via wired or wireless payment machines, or to provide a combination of these functions. The POS system 140 also may communicate with the server 120 through the network 130. In some embodiments, there may be additional staff devices 150 associated with the staff of the retail establishment. The staff devices 150 may be wireless devices similar to user devices 110 and may receive wireless communications from the server 120 of the electronic transaction service provider. Alternatively or additionally, the staff devices 150 may be part of the POS system 140 and/or may exchange communications with the POS system 140. Each of the POS system 140 and staff device 150 includes a processor and a memory configured to store and execute instructions for the electronic transaction software applications described herein. Each of the POS system 140 and the staff device 150 is configured to support wired and/or wireless communications and may include a user interface with a display screen, keypad or buttons, and other inputs/outputs.

To receive the services described herein, a user creates a customer account with the electronic transaction service provider and receives a user software application to be executed by their user device 110 to carry out the methods described herein. The user typically provides personal information to the electronic transaction service provider, for example, to the server 120, which can be used to identify and authenticate the user, such as one or more telephone numbers, addresses, passwords, user names, identifiers associated with the user's user device 110, or combinations thereof. With the personal information provided a user, the server 120 associates the user with the user's user device 110. The user also typically provides data for at least one financial account or instrument such as a credit card, debit card, bank, online currency or other account, which is used to provide payments authorized by the user. The customer account may be created at any time through the network 130. It will be appreciated that a user may choose to create an account at a time when the user has secure access to the network 130, such as through a home network or other interface with greater security than, for example, an unrestricted or free public WLAN. In some embodiments, the user may enter or select one or more preferences associated with the customer account and electronic transaction services. Such preferences may include, for example, preferred payment tips, tip percentage preferences, and loyalty rewards accounts or information.

The retail establishment creates a retail account with the electronic transaction service provider, for example, with the server 120. Example embodiments are described herein for a retail establishment such as a restaurant, café, bar, lounge or other establishment providing food and/or beverage services. It will be appreciated, however, that the embodiments described herein are not limited to a particular type of retailer or retail establishment or to a particular type of goods or services. The systems and methods described herein may be used for any retailer, retail establishment, or business that provides printed or paper bills or invoices to customers. In some embodiments, the bill may be displayed in another system or medium, such as on a computer, terminal or other display and the image of the bill may be captured or photographed from that display. The retail establishments or retailers may have a temporary or permanent site or structure and also may include, for example, food trucks, pop-up restaurants, retail clothing stores, special events or markets. The embodiments described herein may be used to create an electronic payment transaction for a bill received by a customer for goods/services received by the customer and for which immediate payment is required or preferred.

The retail establishment provides information to the electronic transaction service provider, such as the server 120, consisting of contact information and banking or financial account information which enables the electronic transaction service provider to provide payments from the users and customer accounts to the retail account. A separate retail account may be created for each location of a retail establishment. Alternatively, one account may be created for a retail establishment with different banking information provided for each location of that establishment.

The retail establishment also may provide sample bills or invoices and/or an indication of a bill format or standard to the electronic transaction service provider. This information may be provided when the retail account is created, or at a later date, and also may be updated by the retail establishment as bills or formats change. The retail establishment also may provide other information to the electronic transaction service provider, for example the server 120, including for example, location information and/or identifiers for the retailer or establishment, or for tables or other specific sites at each location of the retail establishment. The retail establishment also may provide staff identifiers, which may be associated with and/or displayed on a bill, and/or email addresses associated with the staff and staff devices 150 to the server 120. The sample bills or invoices, and format or other information may be used by the server 120 to determine a bill format associated with the retail establishment and to improve the analysis of bills scanned and submitted by users, as described below.

The retail establishment also may receive a software application to be executed by the POS system 140 and/or a software application for execution by staff devices 150 to carry out the methods described herein. As such, the POS system 140 and/or the staff device 150 may communicate with electronic transaction service provider, such as the server 120. In an example, the server 120 may access the POS system 140 and/or the staff device 150 to retrieve the information related to a payment of an invoice related to a user device 110. The retail account may include contact information, such as email addresses, telephone numbers or messaging system identifiers, for the retail establishment and its staff. Thus, in some embodiments, additional software applications and/or integration of the POS system 140 with the system 100 is not required. The retail establishment and/or its staff may simply receive notification by an email, text or other message that a bill has been paid.

The information received and/or created for each customer and retail account may be encrypted and securely stored by the server 120. The server 120 is configured to maintain the accounts and exchange messages with the user devices 110, staff devices 150 and POS systems 140. The server 120 includes a communications interface, a processor and a memory configured to store and execute instructions for the software applications and functions described herein. While shown as a single entity, the server 120 may consist of multiple processing, storage and communication devices and interfaces configured to carry out the functions described herein. The server 120 also is configured to exchange messages or instructions electronically with one or more financial institutions (not illustrated in FIG. 1) in order to effect and resolve payments between customer accounts and the bank accounts for one or more locations of the retail establishment.

Figure 2:
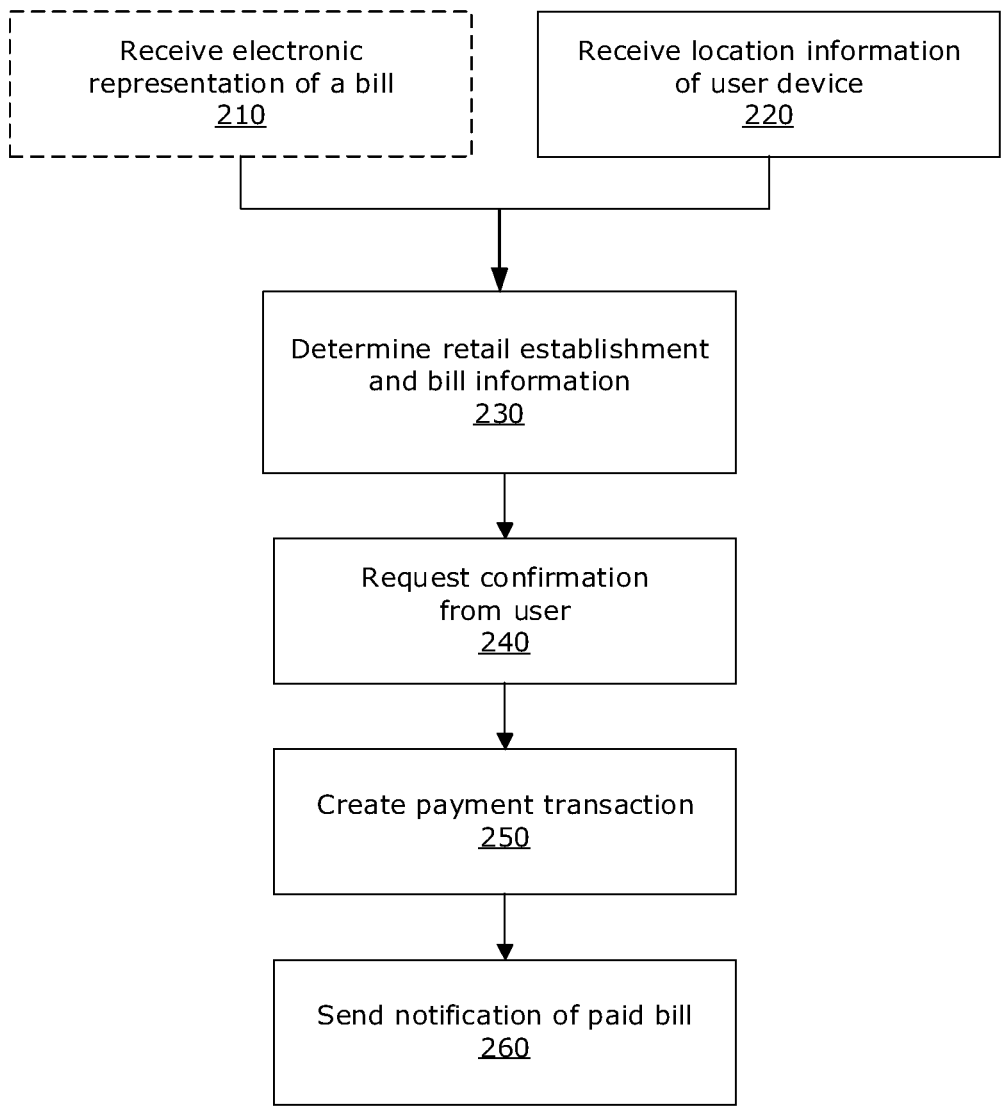
FIG. 2 is a flowchart of a method in accordance with one embodiment of the present disclosure.

FIG. 2 illustrates one embodiment of a method 200 provided by the server 120 of an electronic transaction service provider. The server 120 receives an electronic representation of a bill (action 210) from a user device 110. The electronic representation is typically an electronic image or photograph of the bill which has been captured and transmitted by a user and the electronic transaction software application executed by the user device 110. A customer account number or other identifier associated with the user is also received by the server. In some cases, the server 120 may prompt the user device 110 to provide additional authentication information for the user in order to ensure access to the user's account, and payment authority provided through the electronic transaction application, remain secure.

The server 120 may receive (action 220) additional or extrinsic information from the user device 110 which may be used to identify the format of the bill. When the electronic transaction application is initiated on the user device 110, it may determine a location of the user device 110 using one or more technologies or other applications supported by the user device 110. The location information may include, for example, global positioning system (GPS) information, location information based on a cell or telecommunications coverage area in which the user device 110 is located, location information based on a WLAN network, identifiers or detailed location information about the user device 110 within a location of the retail establishment, as described below, or combinations thereof. The location information of the user device 110 may be transmitted to the server 120 separately or along with the electronic representation of the bill.

The server 120 analyzes the received image to determine the format of the bill and/or the retail establishment associated with the bill (action 230). This determination may be based on the received image and sample invoices or bills, format information and other information previously provided to the server 120; past processing of other bills from the same retail establishment; past processing of similar bill formats from other retail establishments; location information and/or identifiers provided by the user device 110; or combinations of this information. The information displayed on the bill may be computer-generated or hand-printed and may be captured using optical character recognition (OCR) and/or intelligent character recognition (ICR) techniques.

By using additional information which is provided by the user device 110, available from the retail account, and/or known from past bill processing, the capture of information from the image of the bill by the server 120 may be improved. Common patterns from prior OCR scanning results thus may be used by the server 120 to customize OCR algorithms to improve recognition accuracy for a particular bill format which is associated with a particular location and/or retailer. It will be appreciated that OCR scanning results may vary, particularly if the information is captured from photographs which vary in lighting and quality. If the associated or expected bill format has been determined for a particular image, then the scanning by the server 120 may be modified or verified for information which is expected to be provided in a certain location on the bill. For example, the server 120 may process an image but have results such as "table number" missing. If the server 120 has learned that the table number should be the third number that results from a scan for the given bill format, the table number may still be identified from the image sent from the user device 110.

The amount due for the bill and other information also may be determined or identified and captured from the image. This information is digitized as needed and retained by the server 120. The retained information may include a bill number; the retail establishment name, account and/or location identifier; an amount owed to the retail establishment; a table number or other site identifier; the name and/or number of a staff person such as a waiter or server associated with the bill or table; a till number; a product or service identifier; or combinations thereof.

After information is determined for the bill, the server 120 creates and sends a request to the user device 110 (action 240) to confirm payment of the bill. The request to the user device 110 may include the name and location of the retail establishment and the amount to be paid for the bill. In some embodiments, the request may provide a suggested tip to be added to the bill based on the preferences stored for the customer account associated with the user. In some embodiments, the request displayed to the user may enable a user to pay only a portion of the bill based on a percentage or dollar amount.

After confirmation is received from the user device to proceed with payment, the server 120 causes an electronic payment transaction to occur (action 250) so that payment for the confirmed amount of the bill is deducted from the customer account associated with the user and credited to the retail account associated with the retail establishment. The server 120 may not retain or provide funds to either the customer or retail establishment. Instead, the server 120 securely requests and authorizes the appropriate payment or credit transactions between the financial account of the customer, and the bank or financial account associated with the retail establishment or a specific location of the retail establishment. It will be appreciated that the server 120 also may be configured to support other types of payment transactions such as a deduction from a customer's rewards account and a corresponding update or notification to the retail account when a customer redeems rewards points, coupons, promotional offers etc. In some embodiments, the payment is processed in real time to effect payment directly between the customer or user and the retail establishment. In other embodiments deductions from a customer account and/or payments to a retail account may be grouped for processing later in order to reduce processing costs.

The server 120 may send a confirmation to the user device 110 to confirm that the instructions have been received and the payment has been processed. The user may be provided with a confirmation number or other identifier in order to track the transaction. In some embodiments, the method 200 includes the server 120 sending a notification to the retail establishment (action 260) that the bill has been paid. This notification may consist of an email, text or other message to the staff associated with a particular bill and retail establishment to confirm that the bill has been paid. The bill may be identified by a bill number, table number, or a staff name or number, till number, product identifier, a confirmation number, transaction number, or a combination thereof. If the staff person has a staff device 150 configured with the electronic transaction software application described herein, the notification may be provided through a screen display and/or other interface or indicator on the staff device 150, such as an audible alert, flashing light or vibration of the device. Similarly, if the POS system 140 is configured with the electronic transaction software application described herein, the notification may be provided through a screen display or other interface and/or alert on the POS system 140. In some embodiments, the notifications to each staff device 150 and to the POS system 140 may be customized to each particular staff member, or to provide a summary for the tables or sites and bills associated with the POS system 140 and each staff device 150.

In some embodiments, the amount confirmed by a user for the bill and paid by the server 120 at action 250, may be greater or less than the amount of the bill generated by the retail establishment. The difference may be caused by many factors such as a tip being added to the bill, or a user paying only their portion of the bill, as noted above, or a user confirming payment of an incorrect amount. In some embodiments, the users or staff of the retail establishment may request a change by the service provider in the amount which has been paid under the transaction. In some embodiments, the server 120 may be configured to accept and cause multiple payments for the same bill from multiple users executing the electronic transaction software applications described herein. Each user may scan and send the same bill and authorize payment of his or her portion of the bill. In other embodiments, the server 120 may notify the staff person and/or retail establishment associated with the bill that payment has been received but the complete bill or total amount owed has not been paid.

Figure 3:
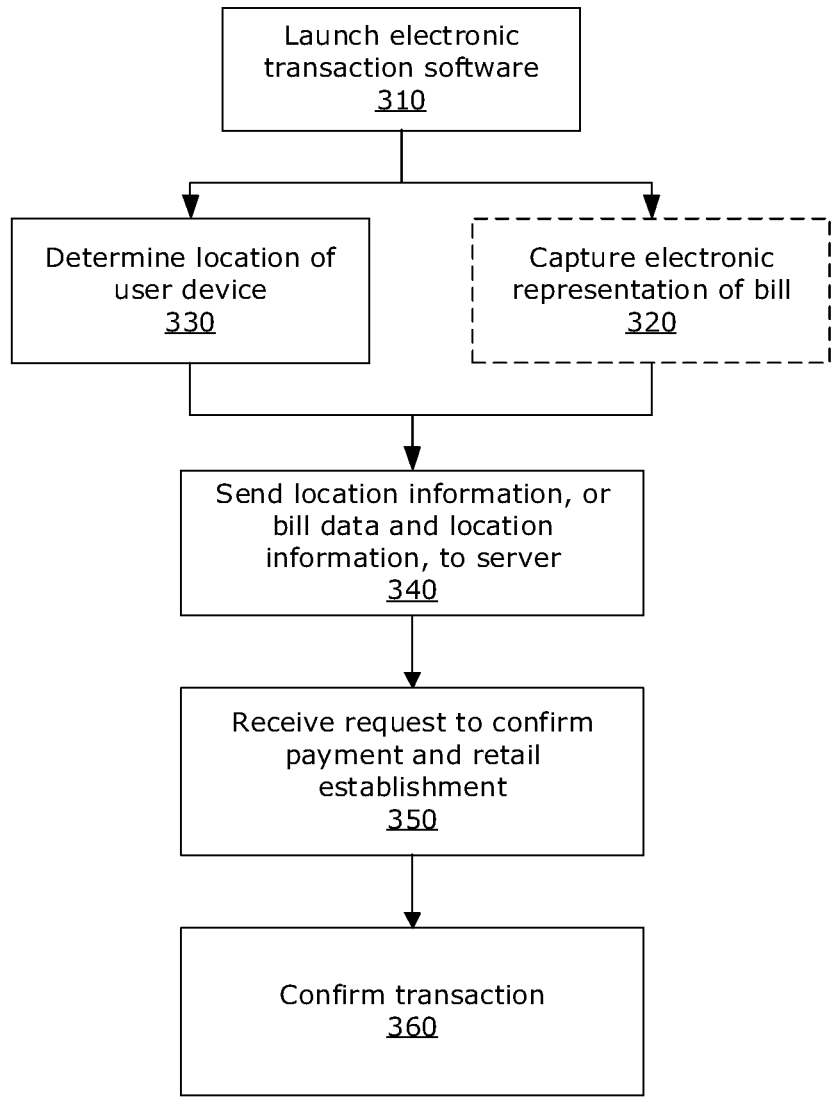
FIG. 3 is a flowchart of a method in accordance with one embodiment of the present disclosure.

FIG. 3 illustrates a method 300 executed by a user device 110 according to embodiments described herein. The method includes the user device 110 receiving an instruction from a user to launch the electronic transaction software application (action 310). The user device 110 and software application enable the user to create an electronic representation of a bill received from a retail establishment (action 320). The bill may be photographed or scanned using the user device 110. At the same time as capturing the image of the bill, or when the application is first launched, or periodically thereafter, the electronic transaction software application causes the user device 110 to determine a location (action 330) of the user device 110. The location may be determined using GPS information; information based on a cell, telecommunications coverage area, or WLAN area in which the user device 110 is located; detailed or "micro-location" information received or determined by the user device 110 within a location of the retail establishment; or combinations thereof. In some embodiments, the location of the user device 110 may be determined by prompting the user to enter or confirm location information, such as a city, the name of the retail establishment, a specific location of a retail establishment, or a combination thereof.

In some embodiments, the retail establishment may have micro-location technology distributed within particular sites in the establishment or affixed to or associated with specific sites, such as tables in a restaurant. The micro-location technology may rely on near-field communications technologies such as BlueTooth™ and/or may use systems such as, but not limited to, the iBeacon™ proximity sensing protocols and technologies. From a micro-location transmitter close or closest to the user device 110, the user device 110 may receive an identifier for the retail establishment and/or a location identifier of the micro-location transmitter. The retail establishment identifier and location identifiers may correspond to the identifiers and information provided by the retail establishment when it created or updated its retail account. Alternatively, the retail establishment identifier and/or the location identifiers provided by the user device 110 from a micro-location transmitter may be added by server 120 to the retail account associated with the establishment as the server tracks and learns the identifiers when processing multiple bills for that establishment.

The electronic capture of the bill and any retail establishment or location information or identifiers may be transmitted to the server 120 by the user device 110 (action 340) through the communications network 130. The network 130 may include an unrestricted or free public WLAN, such as a WLAN provided by the retail establishment itself. Since the electronic transaction software application does not require a user to send sensitive financial information, such as a credit card number, to initiate payment of the bill, the use of a less secure wireless network may be acceptable to the user.

Once the bill and location information have been processed by the server 120, the user device 110 receives and displays (action 350) a request to confirm the payment of the bill as described above. The user may modify the details of the transaction and send confirmation to complete the transaction (action 360). In some embodiments, the user device 110 also may receive a confirmation that the transaction to pay the confirmed amount of the bill has been completed.

Figure 4:
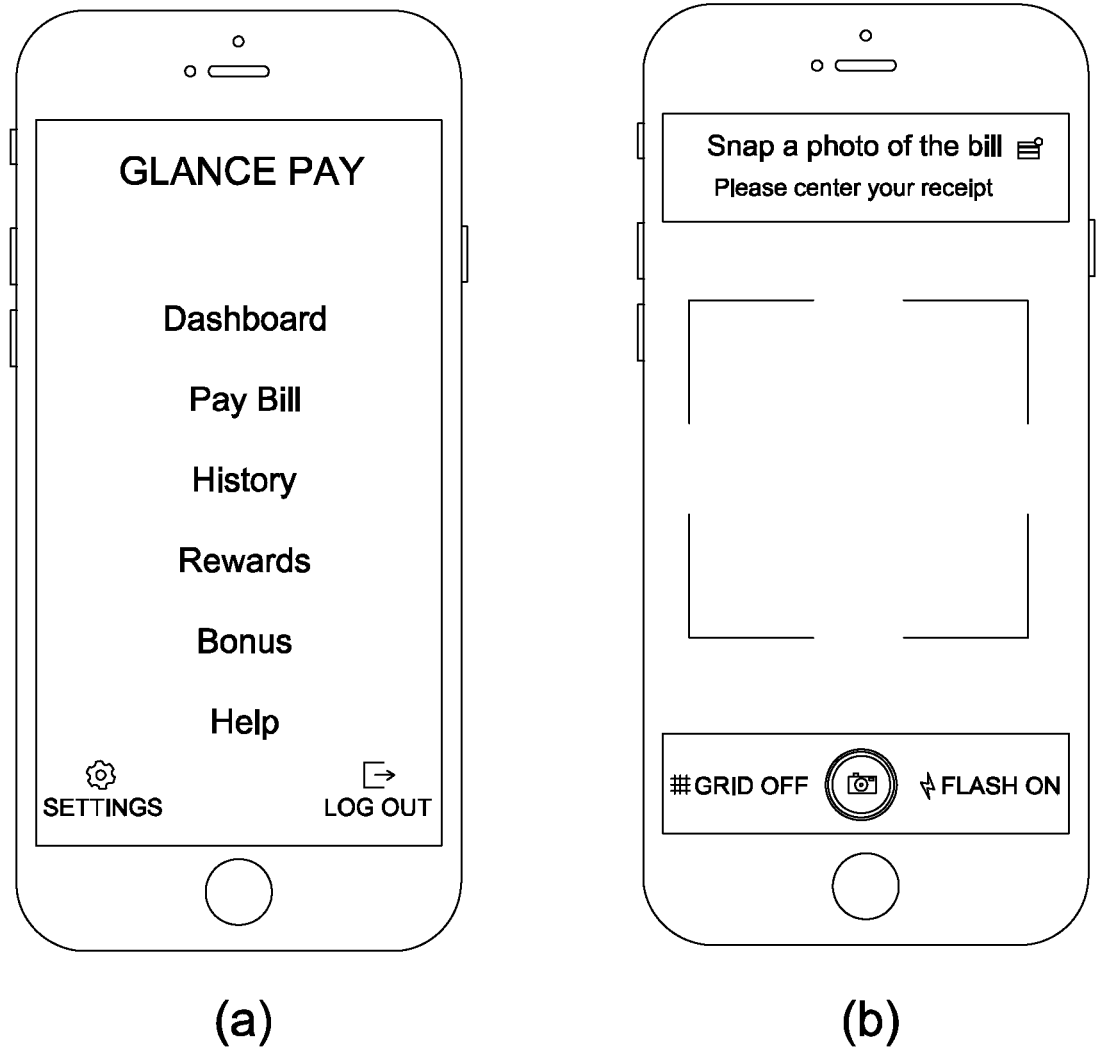
FIGS. 4(a) to 4(d) are sample user interface displays in accordance with one embodiment of the present disclosure.
Figure 4:
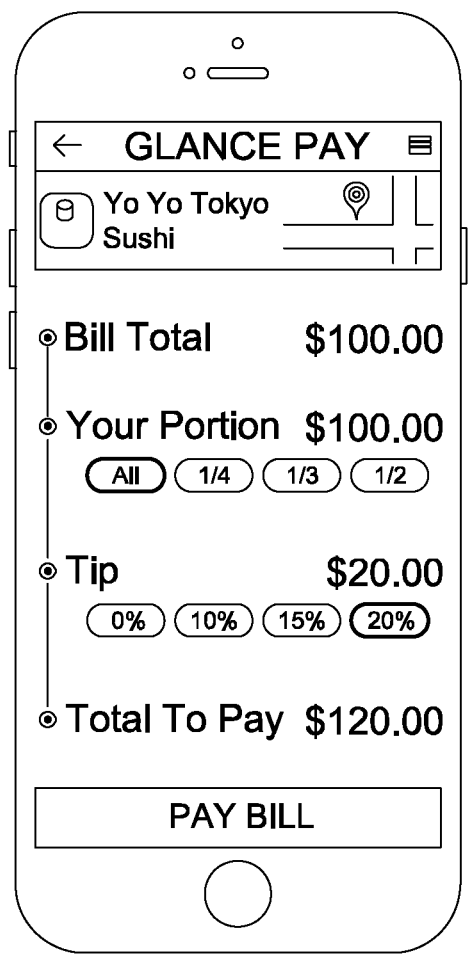
Figure 4:
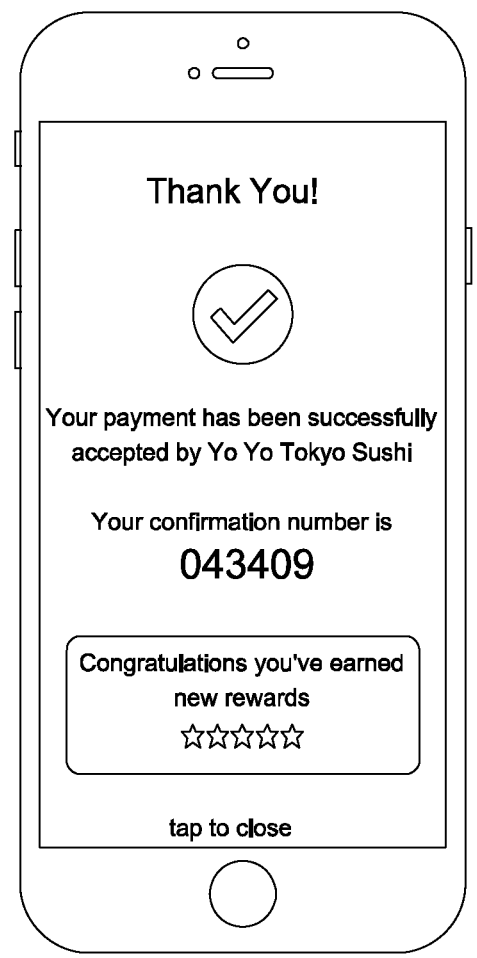

FIGS. 4(*a*)-(*d*) illustrate sample user displays or interfaces which may be shown on the device 110 during operation of the electronic transaction software application described herein. FIG. 4(*a*) illustrates a sample screen display or "dashboard" which appears after the electronic transaction software application is launched. In response to a user selecting the option to "pay bill", the interface of FIG. 4(*b*) may be provided to enable the user to capture an image of the bill. Instructions and/or positive or negative feedback may be provided to the user via this interface to ensure that the user has centered the bill and that an acceptable image has been or will be captured.

FIG. 4(*c*) illustrates a sample interface presented to a user after the user device 110 has received the request from the server 120 to confirm the payment to the retail establishment. This interface may include the name and other identifying information of the retail establishment, including a mapped location. In some embodiments, the user may select the information such as the retail establishment or the displayed location in order to confirm or correct the information. The interface shown in FIG. 4(*c*) may also display the amount of the bill and options for the user to confirm payment of the entire bill, or only a portion of the bill, and to add a tip. In response to the user entering or selecting a command to "pay bill", the user device 110 sends an instruction or message to the server 120 to pay the bill for the confirmed amount. FIG. 4(*d*) illustrates a sample display presented to a user after the electronic payment has been executed and the user device 110 has received confirmation from the server 120. The display may include a confirmation number for the transaction and other information or updates, such as reward program points earned by the user in association with the transaction.

Additional methods for payment of a bill or invoices associated with a retailer or retail establishment may be provided using the systems, devices and methods described herein. In some embodiments, the server 120 is configured to interact with the POS system 140 and/or staff devices 150 in order to obtain the billing information associated with a user device 110, by associating one or more POS systems 140 and/or staff devices 150 with the retail account as described above. The server 120 associates the POS systems 140 and/or the staff devices 150 with the user account by executing a software application as described above. The billing information is associated with the user device 110 and customer by determining location information for the user device 110 within a retail establishment and by obtaining billing information stored in the POS system 140 and/or staff device 150 which is related to the location. Thus, a customer is not required to capture an image of the bill with the user device 110 or send this information to the server 120.

Figure 5:
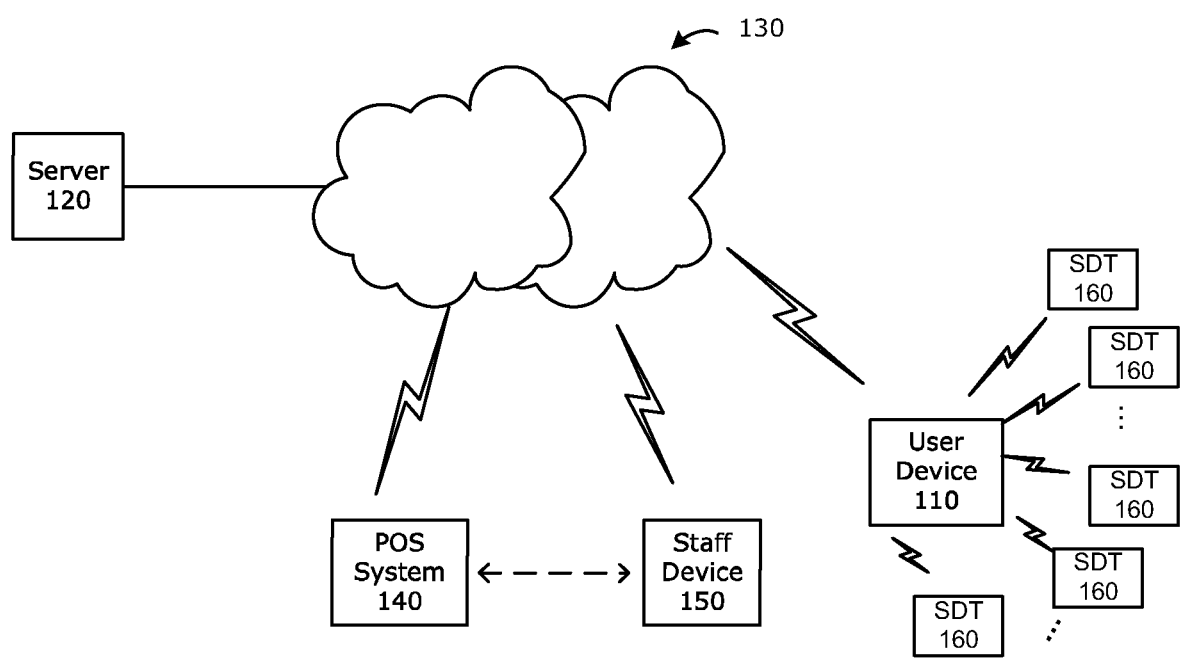
FIG. 5 is a block diagram illustrating a system in accordance with another embodiment of the present disclosure.

Specifically, in some embodiments, location information for a user device 110 in a retail establishment is determined by the use of near-field communications or micro-location technologies as mentioned above. The system in FIG. 5 is the same as that in FIG. 1, except that the system 500 may include one or more short distance transmitters (SDT) 160, often referred to as beacons. The SDT 160 may be placed within the retail establishment for transmitting beacon signals. The SDT 160 may comprise BlueTooth™ low energy devices or devices transmitting signals according to Apple™ iBeacon™, or Google™ Eddystone™, or other protocols. Each SDT 160 is configured to transmit a signal containing information such as an identifier of the SDT 160 or a Universal Resource Locator (URL) which is associated with the specific SDT 160. Depending on types of the SDT 160, beacon signals typically may be received within 4 to 90 m. In some embodiments, the beacon signal also includes an identifier associated with the retail establishment. The user device 110 receives the one or more beacon signals from one or more SDT 160 and executes the user electronic transaction software application to determine location information for the user device 110 based on the strength and/or frequency of each beacon signal, and/or content of each beacon signal, such as the identifier of the SDT 160. Based on the received beacon signals alone, or in combination with other information gathered by or available to the user device 110, various triangulation or trilateration processes may be executed by the user device 110 or the server 120 to determine an absolute or relative position of the user device 110.

As described above, the locations of the SDTs 160 within a retail establishment are known to the server 120 and/or the user device 110. In an example, by combining the beacon signals generated by multiple SDTs 160 with the signal strength and/or distance estimate from the user's user device 110 to each beacon signal, a mathematical triangulation or trilateration of the location of the user and the user device 110 can be determined.

In some embodiments, the user device 110 determines its location within a retail establishment and transmits this information to the server 120. In other embodiments, the user device 110 transmits information regarding the received beacon signals to the server 120 and the server 120 is configured to determine the location of the user device 110 within a retail establishment using the triangulation or trilateration processes described above.

For example, in one embodiment, multiple SDTs 160 are mounted at various points within a retail establishment such as a restaurant. Each SDT 160 may be a standalone device or it may be part of another device such as a POS device. SDTs 160 may be placed, for example, on the walls of the establishment and/or on each table and seat, and/or as part of another fixture or device so as to blend in with the restaurant environment. The SDT 160 locations, transmission powers, and other characteristics are configured so that each table and seat location can be uniquely determined by a user device 110 located in or near each seat location.

In some examples, each SDT 160 is placed at a predetermined location within the retail establishment, such as on the bottom surface of each table and seat. The predetermined location of each SDT 160 in the retail establishment is registered with the electronic transaction service provider, such as the server 120. The user device 110 receives at least one beacon signals from the SDTs 160. Typically, the beacon signal with the strongest strength correspond to the SDT 160 placed on the seat on which the user sits. Therefore, the SDT 160 with the strongest signal strength received by the user device 110 indicates the location of the user device 110 and therefore the location of the user. As such, by identifying identifier of the SDT 160 with the strongest beacon signal among the received beacon signals, the user device 110 then has the same location as the SDT 160, as registered in the server 120. Accordingly, by knowing the specific location of a SDT 160 within a retail establishment, the server 120 knows the location of the user device 110, and the location of the user associated with the user device 110, such as the seat number and the table number.

In some embodiments, the beacon signals of SDT 160 are used along with additional information gathered by sensors or components within the user device 110 to determine the location information. This additional information may include, for example, GPS coordinates of the user device 110, or scans of elements unique to a table or seat such as QR codes or numbers, words or items on a table. The mapping or grid of locations generated by the use of beacons is correlated with the table and seat number assignments in the restaurant's POS system and this information may be stored by the server 120. The mapping or grid locations may be updated in the server 120 from time to time as the restaurant table configuration, seat positions, and/or numbering scheme changes. It will be appreciated that other establishments may be mapped in this manner including but not limited to locations or seats in a stadium, arena, theatre, hair salon or other retail establishment.

While a customer is seated at a table in a restaurant, the customer's user device 110 may receive one or more beacon signals from one or more SDTs 160. In one embodiment, based on the received beacon signals, the user device 110 determines its current location information, for example, by a triangulation or trilateration process, and transmits this location information to the server 120. The location information may be determined at any time, such as when customer first arrives at the restaurant, at the end of a meal service and/or when the customer uses the software application to proceed with bill payment. In some embodiments, the location information may comprise information regarding the received beacon signals and/or identifiers. This information is transmitted to the server 120 and the server 120 processes and correlates the location information with the known mapping or grid location information for the restaurant location in order to determine a current table and seat number corresponding to the customer and user device 110. In some embodiments, the user device 110 receives information regarding the mapping or grid of locations for the restaurant location from the server 120 and the user device 110 determines a specific table and seat number in the restaurant or other predetermined grid location. In that case, the location information transmitted to the server 120 may indicate a specific location or position in the retail establishment and may not require further processing by the server 120.

In some embodiments, the restaurant identification and, if applicable, a specific restaurant location, are also determined by the user device 110 and/or by the server 120 based on the received beacon signals. In other embodiments, the identification of the restaurant and restaurant location may be determined by the user device 110 and/or the server 120 through other means such as by using GPS coordinates of the user device 110, or by a customer selecting a specific restaurant location within the software application.

In one embodiment, based on the retail store or restaurant identification and location information of the user device 110, the server 120 communicates with the POS system 140 of the restaurant location to request the billing information associated with the table and seat number for the customer and user device 110. The information of the goods and services provided to a user at a specific seat of a table is stored in the POS system 140 or staff device 150. Therefore, the POS system 140 and the staff device 150 has the billing information associated with the table and seat number for the customer and user device 110. In other embodiments, the POS system 140 may generate and send the billing information to the server 120, such as in response to a staff person selecting a command to process a specific bill or table and seat number for payment. The billing information may include, as described above, a bill number; the retail establishment name, account and/or location identifier; an amount owed to the retail establishment; the name and/or number of a staff person such as a waiter or server associated with the bill or table; a till number; a product or service identifier; or combinations thereof. In some embodiments, these actions are achieved by modifying or configuring the POS system 140 with the electronic transaction software application described herein in order for the POS system 140 to interact and/or communicate with the server 120. In other embodiments, each staff device 150 receives a software application which is executed to support these actions.

Figure 6:
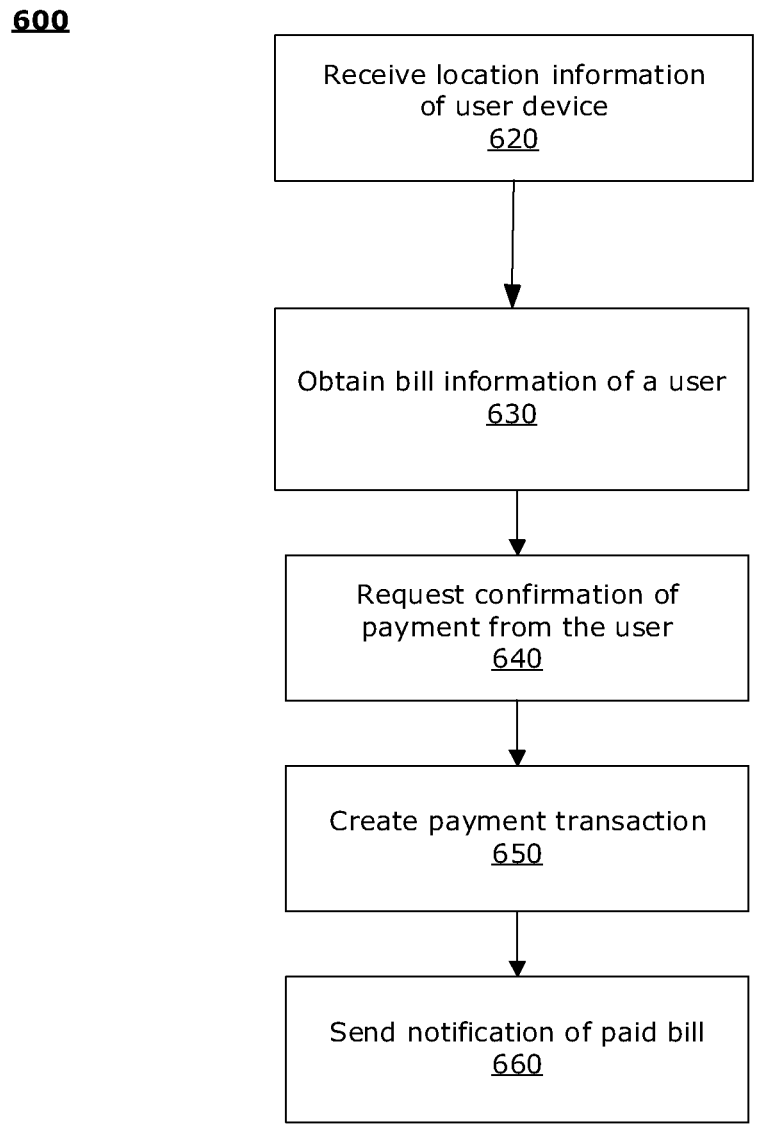
FIG. 6 is a flowchart of a method in accordance with another embodiment of the present disclosure.

FIG. 6 illustrates another embodiment of a method 600 provided by the server 120 of an electronic transaction service provider. The server 120 receives location information of the user device 110 (620). The location information may include beacon signals received by the user device 110, and the server 120 further determines the specific location of the user device 110 and thus the user within a retail establishment, such as a seat number of a table within the retail establishment. In some examples, the location information includes the specific location of the user device 110 within a retail establishment, such as a seat number of a table within the retail establishment restaurant. The location information may also include at least an identifier of the retail establishment, and/or the GPS coordinates of the retail establishment.

Based on the location information from the user device 110, the server 120 then determines the identity of the specific retail establishment, and the bill associated with the user device 110 at a specific seat of the retail establishment (630). In an example, the billing information related to the bill may be checked and confirmed by the server 120 to ensure the bill is associated with a valid retail account created in the server 120. The server 120 creates and sends a request to the user device 110 to confirm payment of the bill (640). The request may include an amount to be paid out. This action may occur in response to a request by the user device 110 to pay a bill. In other embodiments, the request for the customer to confirm payment of the bill may be transmitted automatically by the server 120 based on the existence of an open or unpaid bill in the POS system 140 for the location associated with the user device 110. Once confirmation of a payment amount is received from the user device 110, the server 120 creates an electronic payment transaction (650) to deduct the confirmed payment amount from an account associated with the user and to provide a payment to an account associated with the retailer for the confirmed amount. Optionally, sends notification of a paid bill (660) to the user device 110, POS system 140 and/or staff device 150, for example, by sending an email message to the associated staff person.

Figure 7:
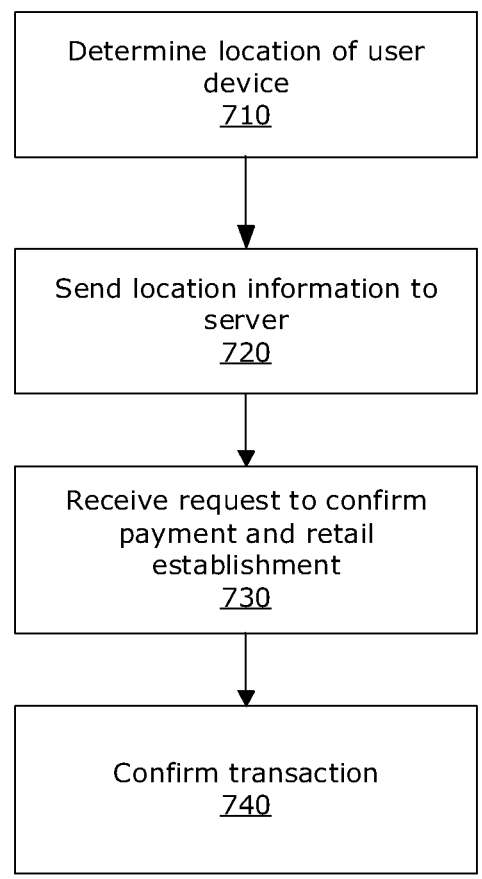
FIG. 7 is a flowchart of a method in accordance with another embodiment of the present disclosure.

FIG. 7 illustrates another embodiment of a method 700 provided by user device 110. The user device 110 in this embodiment may be configured to determine a more specific location of the device 110 (710), and send the location information to the server 120 (720). In some examples, the user device 110 may simply send the received beacon signals, which contain location information of the user device 110, to the server 120, and the server 120 then determines the specific location of the user device 110 using, for example a triangulation or trilateration process or based on the strength of the received beacons signals, according to the predetermined locations of each SDT 160 within a retail establishment. Other information also may be transmitted to the server 120, as described above, such as a user's selection of a restaurant location or GPS coordinates for the user device 110. In this embodiment, however, an image capture or electronic representation of the bill is not created or sent by the user device 110. The user device 110 receives a request to confirm a payment (730) and in response to a user confirming the payment, sends a confirmation to the server 120 in order to complete the transaction (740). As described above, the customer may be presented with other options to add a tip, pay only a portion of a bill, collect or use rewards and/or coupons as part of this transaction.

In a further embodiment, the actions of determining location information for the user device 110 at a retail establishment consist of determining or identifying a POS device, such as staff device 150 or other component, payment terminal, cash register, or the like, (not shown) in the POS system 140 which is nearest to the user device 110. For example, a customer may not be seated or associated with a table and seat number at a restaurant. Instead, if ordering and/or paying for a food or another purchase at a counter, the customer may launch the electronic transaction software application. The user device 110 may receive one or more signals from one or more beacon devices as described above. Based on the received signals the user device 110 determines the nearest POS device at the current establishment.

As described above, the identification of the retail establishment and, if applicable, a specific retail location, are determined by the user device 110 and/or by the server 120 based on the received beacon signals alone or in combination with other means such as by using GPS coordinates of the user device 110, or by a customer selecting a specific restaurant or retail location within the software application. This information may be used by the user device 110 and/or by the server 120, along with the identification of the nearest POS device, in order to determine an outstanding bill associated with the user device 110. In some embodiments, the POS device may transmit the billing information for an open or selected transaction to the server 120. In other embodiments, based on the identified retail establishment and POS device, the server 120 may request the billing information from the POS device and/or from the POS system 140, for one or more open or unpaid transactions of a user device 110. In a further embodiment, the billing information may be transmitted by the POS device directly to the user device 110 using BlueTooth™ or similar short-distance communications technologies. In this embodiment, the user device 110 is configured to send the billing information directly to the server 120. The billing information may be checked and confirmed by the server 120 to ensure it is associated with a valid retail account. As described above, the server 120 then sends a request to the user device 110 to confirm payment of the bill, and payment may be approved and confirmed.

In other example embodiments, a customer's position is not necessarily fixed or linked to a table and/or seat but can be defined by a different relationship to an identifier in the POS system 140. For example, a beacon device in a golf cart may transmit a signal which is received by the user device 110. Orders associated with the specific golf cart number in the POS system of the golf course thus may be linked to the user device 110 and customer for payment. In these embodiments, the GPS coordinates of the user device 110 also may be used by the user device 110 and/or by the server 120 to determine and/or verify the location of the user device 110 at the establishment associated with the beacon signals.

Although the exemplary embodiments described herein employ the memory, other types of computer readable media which can store data that are accessible by a computer, such as magnetic cassettes, flash memory cards, digital versatile disks, cartridges, random access memories (RAMs), read only memory (ROM), USB or memory sticks, a cable or wireless signal containing a bit stream and the like, also may be used in the exemplary operating environment. Non-transitory computer-readable storage media expressly exclude media such as energy, carrier signals, electromagnetic waves and signals per se.

Thus, it is apparent that there has been provided in accordance with the embodiments of the present disclosure systems and methods for electronic payment transactions that fully satisfy the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The invention claimed is:

1. A computer-implemented electronic payment method, comprising:
   receiving, by a server from a wireless communication device, one or more beacon signals of one or more short distance transmitters (SDTs) received by the wireless communication device and global positioning system (GPS) information indicating a location of the wireless communication device;
   determining, by the server, a SDT nearest to the wireless communication device based on the one or more beacon signals and GPS information;
   determining, by the server, a bill associated with the wireless communication device based on the SDT, each SDT in a plurality of SDTs being associated with a bill, one bill at a time;
   determining, by the server, a user account associated with the wireless communication device;
   obtaining, by the server from a point of sale (POS) system of a retailer, bill information for the bill, wherein the POS system maintains bill information for a plurality of SDTs;
   generating, by the server, a request for user input confirming payment of the bill based on the bill information and payment information associated with the user account maintained by the server, wherein the request causes a graphical user interface (GUI) screen to be displayed on a display of the wireless communication device, the GUI including an element for receiving user input for confirming payment of the bill;
   sending, by the server, the request to the wireless communication device;
   receiving, by the server, user input confirming payment of the bill from the wireless communication device, the user input indicating a payment amount;
   generating, by the server, an electronic payment instruction in response to receiving user input confirming payment of the bill from the wireless communication device, the electronic payment instruction being based on payment information associated with the user account maintained by the server, financial payment information associated with a retailer account associated with the retailer maintained by the server, and the payment amount; and
   causing the electronic payment instruction transaction to be performed.

2. The computer-implemented method of claim 1, wherein the SDTs and one or more beacon signals use micro-location technology.

3. The computer-implemented method of claim 1, wherein the SDT nearest to the wireless communication device is determined by the server using a triangulation or trilateration process.

4. The computer-implemented method of claim 1, wherein the one or more beacon signals each include an identifier associated with a respective SDT.

5. The computer-implemented method of claim 1, wherein the SDT nearest to the wireless communication device is determined by comparing a strength, frequency and/or content of the one or more beacon signals.

6. The computer-implemented method of claim 1, wherein the SDT nearest to the wireless communication device is determined by identifying the beacon signal having the strongest signal, and determining an identifier of the SDT from the beacon signal having the strongest signal, wherein the SDT nearest to the wireless communication device is determined from the identifier of the SDT having the strongest signal.

7. The computer-implemented method of claim 1, wherein the SDT nearest to the wireless communication device is determined by the server based on the one or more beacon signals, GPS information and scan data.

8. The computer-implemented method of claim 7, wherein the scan data comprises a Quick Response (QR) code.

9. The computer-implemented method of claim 1, wherein causing the electronic payment instruction transaction to be performed comprises:
   executing the electronic payment instruction transaction.

10. A non-transitory computer readable storage medium having stored thereon computer-readable and computer-executable instructions, which, when executed by a processor of a server, cause the processor to:
    receiver, by the server from a wireless communication device, one or more beacon signals of one or more short distance transmitters (SDTs) received by the wireless communication device and global positioning system (GPS) information indicating a location of the wireless communication device;

determine, by the server, a SDT nearest to the wireless communication device based on the one or more beacon signals and GPS information;

determine, by the server, a bill associated with the wireless communication device based on the SDT, each SDT in a plurality of SDTs being associated with a bill, one bill at a time;

determine, by the server, a user account associated with the wireless communication device;

obtain, by the server from a point of sale (POS) system of a retailer, bill information for the bill, wherein the POS system maintains bill information for a plurality of SDTs;

generate, by the server, a request for user input confirming payment of the bill based on the bill information and payment information associated with the user account maintained by the server, wherein the request causes a graphical user interface (GUI) screen to be displayed on a display of the wireless communication device, the GUI including an element for receiving user input for confirming payment of the bill;

send, by the server, the request to the wireless communication device;

receive, by the server, user input confirming payment of the bill from the wireless communication device, the user input indicating a payment amount;

generate, by the server, an electronic payment instruction in response to receiving user input confirming payment of the bill from the wireless communication device, the electronic payment instruction being based on payment information associated with the user account maintained by the server, financial payment information associated with a retailer account associated with the retailer maintained by the server, and the payment amount; and cause the electronic payment instruction transaction to be performed.

11. A server, comprising:
a processor configured to:
receiver, by the server from a wireless communication device, one or more beacon signals of one or more short distance transmitters (SDTs) received by the wireless communication device and global positioning system (GPS) information indicating a location of the wireless communication device;

determine, by the server, a SDT nearest to the wireless communication device based on the one or more beacon signals and GPS information;

determine, by the server, a bill associated with the wireless communication device based on the SDT, each SDT in a plurality of SDTs being associated with a bill, one bill at a time;

determine, by the server, a user account associated with the wireless communication device;

obtain, by the server from a point of sale (POS) system of a retailer, bill information for the bill, wherein the POS system maintains bill information for a plurality of SDTs;

generate, by the server, a request for user input confirming payment of the bill based on the bill information and payment information associated with the user account maintained by the server, wherein the request causes a graphical user interface (GUI) screen to be displayed on a display of the wireless communication device, the GUI including an element for receiving user input for confirming payment of the bill;

send, by the server, the request to the wireless communication device;

receive, by the server, user input confirming payment of the bill from the wireless communication device, the user input indicating a payment amount;

generate, by the server, an electronic payment instruction in response to receiving user input confirming payment of the bill from the wireless communication device, the electronic payment instruction being based on payment information associated with the user account maintained by the server, financial payment information associated with a retailer account associated with the retailer maintained by the server, and the payment amount; and cause the electronic payment instruction transaction to be performed.

12. The computer-implemented method of claim 1, wherein causing the electronic payment instruction transaction to be performed comprises:
sending the electronic payment instruction to a payment processor for execution.

13. The computer-implemented method of claim 1, wherein the GUI comprises an element for specifying the payment amount from a plurality of payment options, wherein the plurality of payment options include a portion of a billed amount and an amount of a tip to be added to the billed amount based on the portion of the billed amount to be paid.

14. The computer-implemented method of claim 1, wherein the SDTs and one or more beacon signals use the iBeacon communication protocol.

15. The computer-implemented method of claim 1, further comprising:
sending a notification to the retailer confirming payment of the bill.

16. The computer-implemented method of claim 15, wherein sending the notification to the retailer comprises sending an electronic message to a wireless communication device of a staff person associated with the bill.

17. The non-transitory computer readable storage medium of claim 10, wherein the GUI comprises an element for specifying the payment amount from a plurality of payment options, wherein the plurality of payment options include a portion of a billed amount and an amount of a tip to be added to the billed amount based on the portion of the billed amount to be paid.

18. The server of claim 11, wherein the GUI comprises an element for specifying the payment amount from a plurality of payment options, wherein the plurality of payment options include a portion of a billed amount and an amount of a tip to be added to the billed amount based on the portion of the billed amount to be paid.

19. The server of claim 11, wherein the SDTs and one or more beacon signals use the iBeacon communication protocol.

* * * * *